US012699025B2

(12) United States Patent
Jin et al.

(10) Patent No.: US 12,699,025 B2
(45) Date of Patent: Aug. 4, 2026

(54) HEAD LIFE EVALUATION APPARATUS AND METHOD

(71) Applicant: SEMES CO., LTD., Cheonan-si (KR)

(72) Inventors: Won-Yong Jin, Cheonan-si (KR);
Suk-Won Jang, Pyeongtaek-si (KR);
Jae-Duck Lee, Seongnam-si (KR);
Hosang Lee, Asan-si (KR)

(73) Assignee: SEMES CO., LTD., Cheonan-si (KR)

( * ) Notice: Subject to any disclaimer, the term of this patent is extended or adjusted under 35 U.S.C. 154(b) by 530 days.

(21) Appl. No.: 18/141,281

(22) Filed: Apr. 28, 2023

(65) Prior Publication Data

US 2023/0349791 A1 Nov. 2, 2023

(30) Foreign Application Priority Data

May 2, 2022 (KR) ........................ 10-2022-0054246

(51) Int. Cl.
| | |
|---|---|
| *G01M 13/00* | (2019.01) |
| *B05B 15/555* | (2018.01) |
| *B41J 2/165* | (2006.01) |
| *B41J 2/21* | (2006.01) |

(52) U.S. Cl.
CPC ........... *G01M 13/00* (2013.01); *B05B 15/555* (2018.02); *B41J 2/16523* (2013.01); *B41J 2/16552* (2013.01); *B41J 2/2114* (2013.01); *B41P 2235/26* (2013.01)

(58) Field of Classification Search
CPC .................................................... G01M 13/00
See application file for complete search history.

(56) References Cited

U.S. PATENT DOCUMENTS 9,340,050 B2 5/2016 Otani et al.
10,493,749 B2 12/2019 Yamamuro et al.

FOREIGN PATENT DOCUMENTS

| JP | 2015-217593 A | 12/2015 | |
| JP | 2016112554 A * | 6/2016 | |
| JP | 2016-168733 A | 9/2016 | |
| JP | 6425701 B2 | 11/2018 | |
| JP | 6444040 B2 | 12/2018 | |
| KR | 10-2012-0018975 A | 3/2012 | |
| WO | WO-2016042722 A1 * | 3/2016 | .......... B41J 2/14201 |

* cited by examiner

*Primary Examiner* — Walter L Lindsay, Jr.
*Assistant Examiner* — Andrew V Do
(74) *Attorney, Agent, or Firm* — Muir Patent Law, PLLC

(57) ABSTRACT

Provided are a head life evaluation apparatus and method capable of evaluating lifespans of nozzles by using a plurality of chambers having different environments, the head life evaluation apparatus including a head block including at least one first nozzle for ejecting a treatment liquid in an inkjet manner, and a chamber block detachably coupled to the head block and including at least one first chamber corresponding to the first nozzle to evaluate a lifespan of the first nozzle in a first environment.

20 Claims, 10 Drawing Sheets

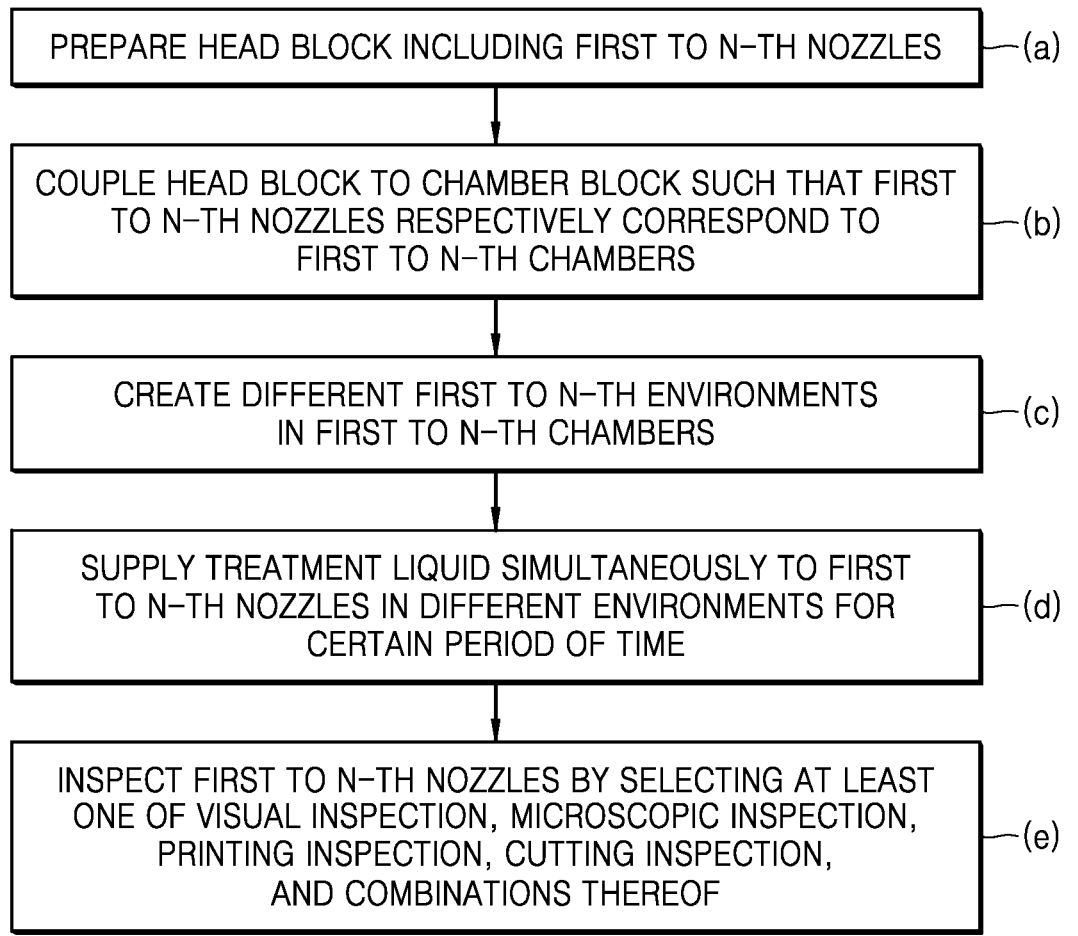

PREPARE HEAD BLOCK INCLUDING FIRST TO N−TH NOZZLES —(a)

COUPLE HEAD BLOCK TO CHAMBER BLOCK SUCH THAT FIRST TO N−TH NOZZLES RESPECTIVELY CORRESPOND TO FIRST TO N−TH CHAMBERS —(b)

CREATE DIFFERENT FIRST TO N−TH ENVIRONMENTS IN FIRST TO N−TH CHAMBERS —(c)

SUPPLY TREATMENT LIQUID SIMULTANEOUSLY TO FIRST TO N−TH NOZZLES IN DIFFERENT ENVIRONMENTS FOR CERTAIN PERIOD OF TIME —(d)

INSPECT FIRST TO N−TH NOZZLES BY SELECTING AT LEAST ONE OF VISUAL INSPECTION, MICROSCOPIC INSPECTION, PRINTING INSPECTION, CUTTING INSPECTION, AND COMBINATIONS THEREOF —(e)

HEAD LIFE EVALUATION APPARATUS AND METHOD

CROSS-REFERENCE TO RELATED PATENT APPLICATION

This application claims the benefit of Korean Patent Application No. 10-2022-0054246, filed on May 2, 2022, in the Korean Intellectual Property Office, the disclosure of which is incorporated herein in its entirety by reference.

BACKGROUND OF THE INVENTION

1. Field of the Invention

The present invention relates to a head life evaluation apparatus and method and, more particularly, to a head life evaluation apparatus and method capable of evaluating lifespans of nozzles by using a plurality of chambers having different environments.

2. Description of the Related Art

In general, currently, display devices which are electro-optical devices called liquid crystal devices, electroluminescent devices, etc. are being widely used in electronic devices such as mobile phones, portable computers, smart pads, and televisions, and full-color display by the display devices is increasing.

Full-color display by the liquid crystal devices may be realized by, for example, passing, through a color filter, light modulated by a liquid crystal layer. The color filter may be formed by, for example, arranging dot-shaped red (R), green (G), and blue (B) filter elements in a certain array called a stripe array, a delta array, or a mosaic array on the surface of a substrate made of glass or the like.

Photolithography is known as a method of patterning filter elements of various colors such as R, G, and B. However, when photolithography is used, process complexity is increased or a high cost is required due to large consumption of various color materials or a photoresist.

To solve the above problems, an inkjet printing method for forming filter elements in a dot array by ejecting a material of each filter element (e.g., ink) by using an inkjet scheme for ejecting droplets is proposed.

In particular, the inkjet-type treatment liquid ejection apparatus market is one of the major technology-based markets emerging in the current industry, and is positioned as an important core technology in the high value-added display industry to enable room-temperature and atmosphere production beyond vacuum deposition production.

SUMMARY OF THE INVENTION

However, according to general inkjet-type treatment liquid ejection apparatuses using a high-priced head provided with nozzles, nozzle clogging occurs unavoidably and frequently due to an issue of stability of ink when used for a long period, misplacement or ejection failure of droplets due to the nozzle clogging greatly reduces product quality, and a high cost is required to replace the high-priced head or nozzles so as to significantly increase a unit cost of production.

The present invention provides a head life evaluation apparatus and method capable of evaluating lifespans of nozzles by using a plurality of chambers having different environments, and of obtaining an environment condition optimized for a head based on the evaluation result. However, the scope of the present invention is not limited thereto.

According to an aspect of the present invention, there is provided a head life evaluation apparatus including a head block including at least one first nozzle for ejecting a treatment liquid in an inkjet manner, and a chamber block detachably coupled to the head block and including at least one first chamber corresponding to the first nozzle to evaluate a lifespan of the first nozzle in a first environment.

First to n-th nozzles (where n is a natural number) may be disposed in one or more rows on a surface of the head block facing the chamber block, and first to n-th chambers provided in a concave shape to respectively correspond to the first to n-th nozzles may be disposed in one or more rows on a surface of the chamber block facing the head block.

The head block may be an upper movable structure raised or lowered by a lifting device, and the chamber block may be a lower fixed structure fixed to be couplable to the head block.

The first or n-th chamber may include a chamber body providing an inner space having an open top, a treatment liquid discharge line mounted under the inner space, and a humidity control line for supplying humidified or dehumidified air or moisture to the inner space to maintain the inner space at a first humidity or at an n-th humidity different from the first humidity.

The first or n-th chamber may further include a temperature control device mounted on the humidity control line or the chamber body to maintain the inner space at a first temperature or at an n-th temperature different from the first temperature.

The first or n-th chamber may further include an oxygen supply device mounted on the chamber body to maintain the inner space at a first oxygen level or at an n-th oxygen level different from the first oxygen level.

The first or n-th chamber may further include a pressure control line mounted on the chamber body to maintain the inner space at a first pressure or at an n-th pressure different from the first pressure.

The head life evaluation apparatus may further include a sensor including at least one of a humidity sensor, a temperature sensor, an oxygen sensor, a pressure sensor, and combinations thereof, and a controller for receiving a measurement signal from the sensor and applying at least one of a humidity control signal for maintaining the inner space at a certain humidity, a temperature control signal for maintaining the inner space at a certain temperature, an oxygen control signal for maintaining the inner space at a certain oxygen level, a pressure control signal for maintaining the inner space at a certain pressure, and combinations thereof selectively to at least one of the humidity control line, a temperature control device, an oxygen supply device, a pressure control line, and combinations thereof.

The chamber body may include a treatment liquid collector provided in a funnel shape under the inner space, and the treatment liquid collector may be connected to the treatment liquid discharge line.

The treatment liquid discharge line may include a treatment liquid discharge pipe connected to the chamber body, a separation tank connected to the treatment liquid discharge pipe to separate the treatment liquid from a gas, a drain line provided at a lower portion of the separation tank to discharge the treatment liquid, a vacuum line provided at an upper portion of the separation tank to form a vacuum pressure in the separation tank, and a purge line for purifying an inside of the separation tank.

The first or n-th chamber may further include a separator mounted in the chamber body to protect the first nozzle or the sensor from air or moisture.

The separator may be a mesh member capable of filtering out foreign substances, or a stabilizer capable of making air flows uniform.

The head life evaluation apparatus may further include a guide mounted between the head block and the chamber block to seal the first chamber of the chamber block when the head block is coupled to the chamber block.

The guide may be an O-ring or a sealing member.

The head life evaluation apparatus may further include a treatment liquid supply device for supplying the treatment liquid simultaneously to the first to n-th nozzles.

According to another aspect of the present invention, there is provided a head life evaluation method including (a) preparing a head block including first to n-th nozzles, (b) coupling the head block to a chamber block such that the first to n-th nozzles respectively correspond to first to n-th chambers, (c) creating different first to n-th environments in the first to n-th chambers, and (d) supplying a treatment liquid simultaneously to the first to n-th nozzles in different environments for a certain period of time.

In step (c), the first to n-th chambers may be differently controlled by selecting at least one of a humidity, a temperature, an oxygen level, a pressure, and combinations thereof.

In step (d), the treatment liquid supplied to the first to n-th chambers may be collected through a treatment liquid discharge line.

The head life evaluation method may further include (e) inspecting the first to n-th nozzles by selecting at least one of visual inspection, microscopic inspection, printing inspection, cutting inspection, and combinations thereof, after step (d).

According to another aspect of the present invention, there is provided a head life evaluation apparatus including a head block including first to n-th nozzles (where n is a natural number) for ejecting a treatment liquid in an inkjet manner, and a chamber block detachably coupled to the head block and including first to n-th chambers respectively corresponding to the first to n-th nozzles to evaluate lifespans of the first to n-th nozzles in first to n-th environments, wherein the first or n-th chamber includes a chamber body providing an inner space having an open top, a treatment liquid discharge line mounted under the inner space, a humidity control line for supplying humidified or dehumidified air or moisture to the inner space to maintain the inner space at a first humidity or at an n-th humidity different from the first humidity, a temperature control device mounted on the humidity control line or the chamber body to maintain the inner space at a first temperature or at an n-th temperature different from the first temperature, an oxygen supply device mounted on the chamber body to maintain the inner space at a first oxygen level or at an n-th oxygen level different from the first oxygen level, a sensor including at least one of a humidity sensor, a temperature sensor, an oxygen sensor, a pressure sensor, and combinations thereof, and a controller for receiving a measurement signal from the sensor and applying at least one of a humidity control signal for maintaining the inner space at a certain humidity, a temperature control signal for maintaining the inner space at a certain temperature, an oxygen control signal for maintaining the inner space at a certain oxygen level, a pressure control signal for maintaining the inner space at a certain pressure, and combinations thereof selectively to at least one of the humidity control line, the temperature control device, the oxygen supply device, a pressure control line, and combinations thereof.

BRIEF DESCRIPTION OF THE DRAWINGS

The above and other features and advantages of the present invention will become more apparent by describing in detail embodiments thereof with reference to the attached drawings in which:

FIG. 7 is a plan view of a treatment liquid coating system including the head life evaluation apparatus of FIG. 1;

FIG. 10 is a flowchart of a head life evaluation method according to some embodiments of the present invention.

DETAILED DESCRIPTION OF THE INVENTION

Figure 1:
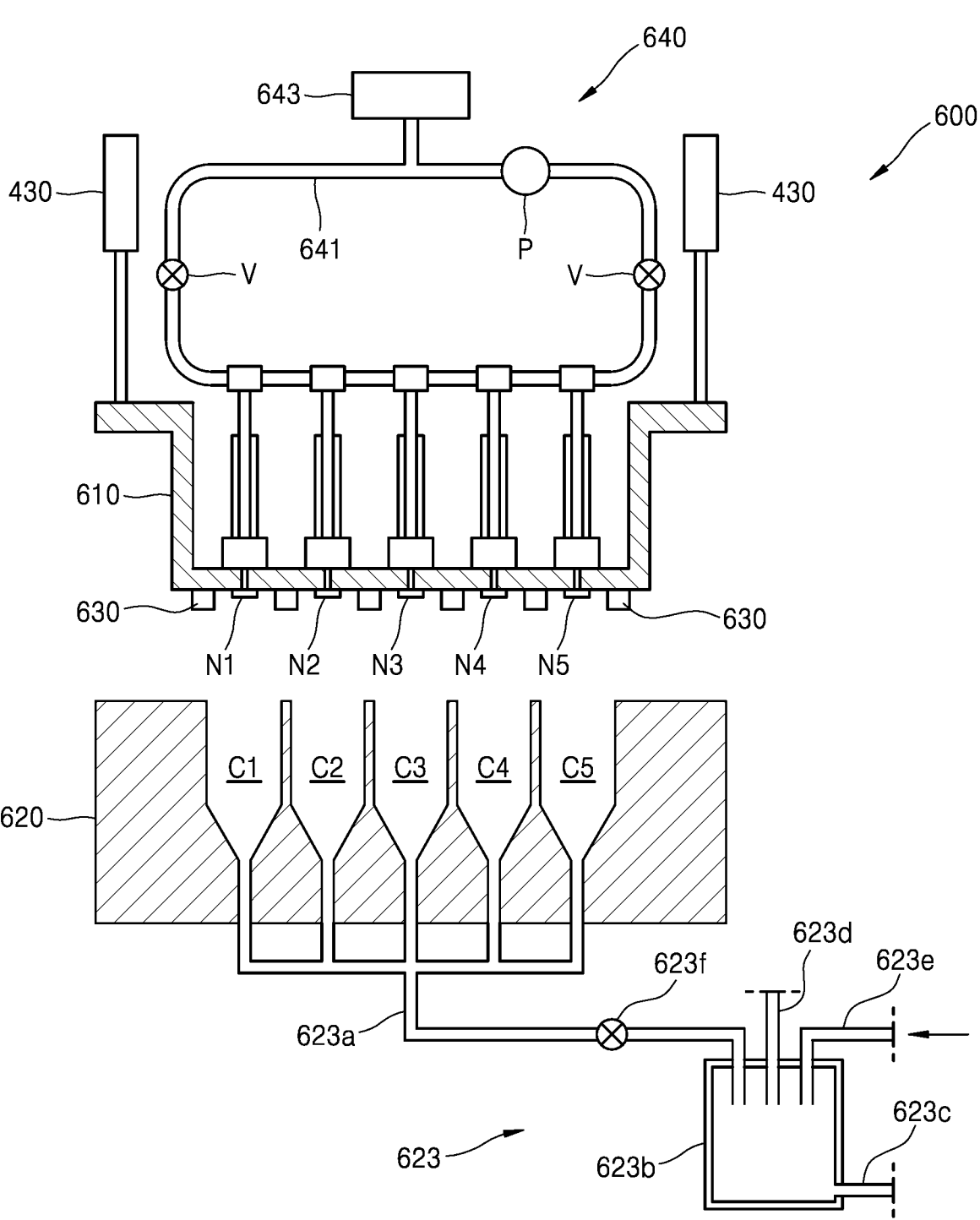
FIG. 1 is a cross-sectional view showing a chamber-decoupled state of a head life evaluation apparatus according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

The terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, components, and/or groups thereof, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
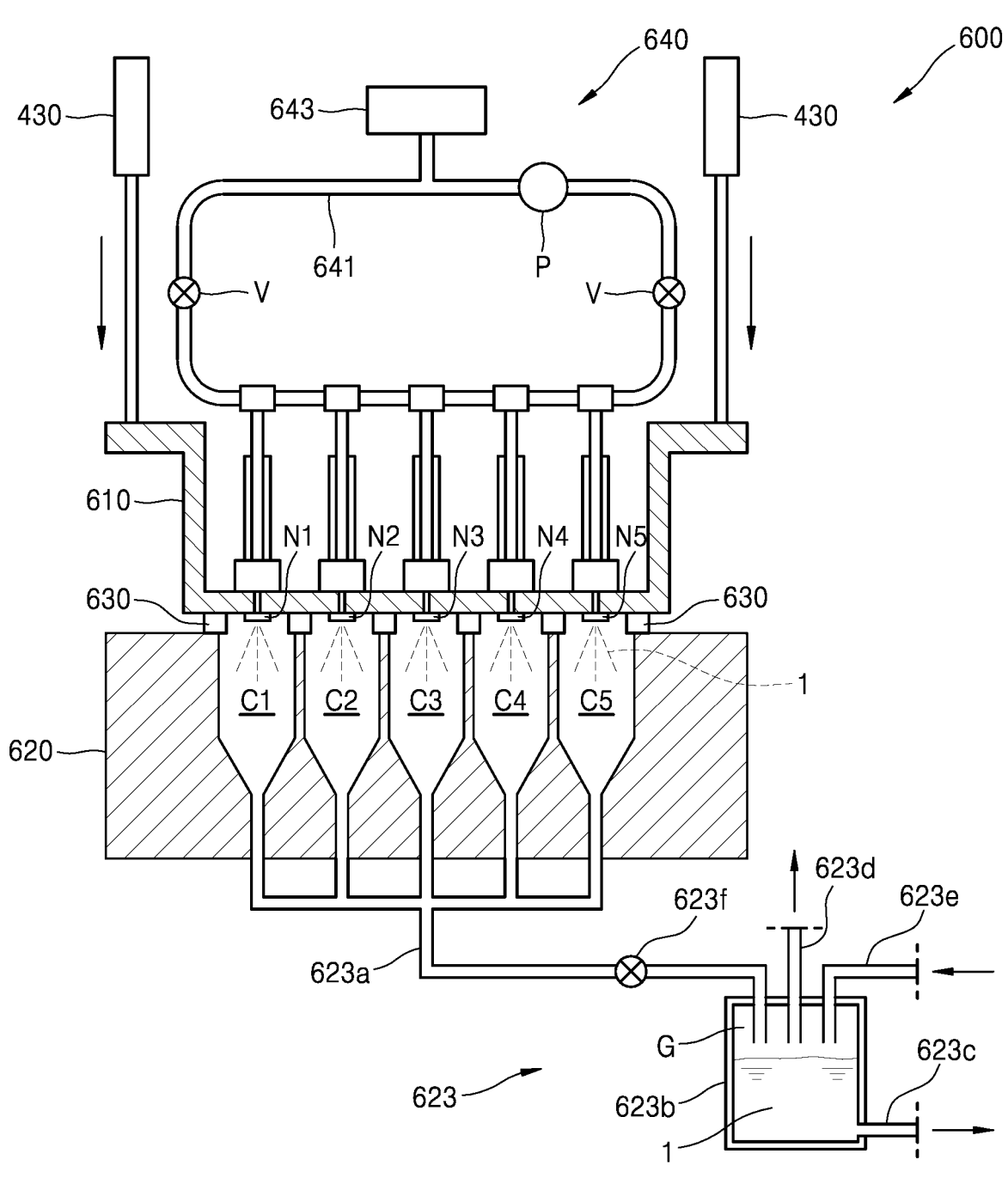
FIG. 2 is a cross-sectional view showing a chamber-coupled state of the head life evaluation apparatus of FIG. 1.

FIG. 1 is a cross-sectional view showing a chamber-decoupled state of a head life evaluation apparatus 600 according to some embodiments of the present invention, and FIG. 2 is a cross-sectional view showing a chamber-coupled state of the head life evaluation apparatus 600 of FIG. 1.

Initially, as shown in FIGS. 1 and 2, the head life evaluation apparatus 600 according to some embodiments of the present invention may mainly include a head block 610 and a chamber block 620.

For example, the head block 610 is a structure including at least one first nozzle N1 for ejecting a treatment liquid 1 in an inkjet manner, and the first nozzle N1 and a plurality of other nozzles, e.g., first to n-th nozzles N1 to Nn (where n is a natural number), may be disposed in one or more rows on a surface of the head block 610 facing the chamber block 620.

As shown in FIGS. 1 and 2, the head block 610 may have mounted therein a total of five nozzles, e.g., a first nozzle N1, a second nozzle N2, a third nozzle N3, a fourth nozzle N4, and a fifth nozzle N5. However, the number of nozzles mounted in the head block 610 is not limited thereto and, for example, plural numbers greater than or equal to 1 are all applicable.

For example, the chamber block 620 is a structure detachably coupled to the head block 610 and including at least one first chamber C1 corresponding to the first nozzle N1 to evaluate the lifespan of the first nozzle N1 in a first environment, and the first chamber C1 and a plurality of other chambers, e.g., first to n-th chambers C1 to Cn provided in a concave shape to respectively correspond to the first to n-th nozzles N1 to Nn, may be disposed in one or more rows on a surface of the chamber block 620 facing the head block 610.

As shown in FIGS. 1 and 2, the chamber block 620 may have mounted therein a total of five chambers, e.g., a first chamber C1, a second chamber C2, a third chamber C3, a fourth chamber C4, and a fifth chamber C5. However, the number of chambers mounted in the chamber block 620 is not limited thereto and, for example, plural numbers greater than or equal to 1 are all applicable.

For example, the head block 610 may be an upper movable structure raised or lowered by a lifting device 430, and the chamber block 620 may be a lower fixed structure fixed to be couplable to the head block 610.

Herein, the lifting device 430 may use a motor, a linear motor, a pneumatic or hydraulic cylinder, or the like as a power source, and various power transmission devices, e.g., a combination of screw rods, a combination of gears, a combination of belt pulleys, a combination of wire pulleys, a combination of chain sprocket wheels, and a combination of magnets along various rails, sliders, and guides, are applicable.

Therefore, as shown in FIG. 1, in the chamber-decoupled state, the head block 610 may stand by while being raised by the lifting device 430 and, in this case, a new head block or nozzle may be replaced. Meanwhile, the first to fifth chambers C1 to C5 may be open at the top and thus inner spaces thereof may be cleaned or a life evaluation process may be prepared.

Thereafter, as shown in FIG. 2, in the chamber-coupled state, the head block 610 may be lowered by the lifting device 430 and coupled to the chamber block 620 to seal the chambers C1 to C5, and then different environments may be created in the chambers C1 to C5 to expose the nozzles N1 to Nn to various environments.

Figure 3:
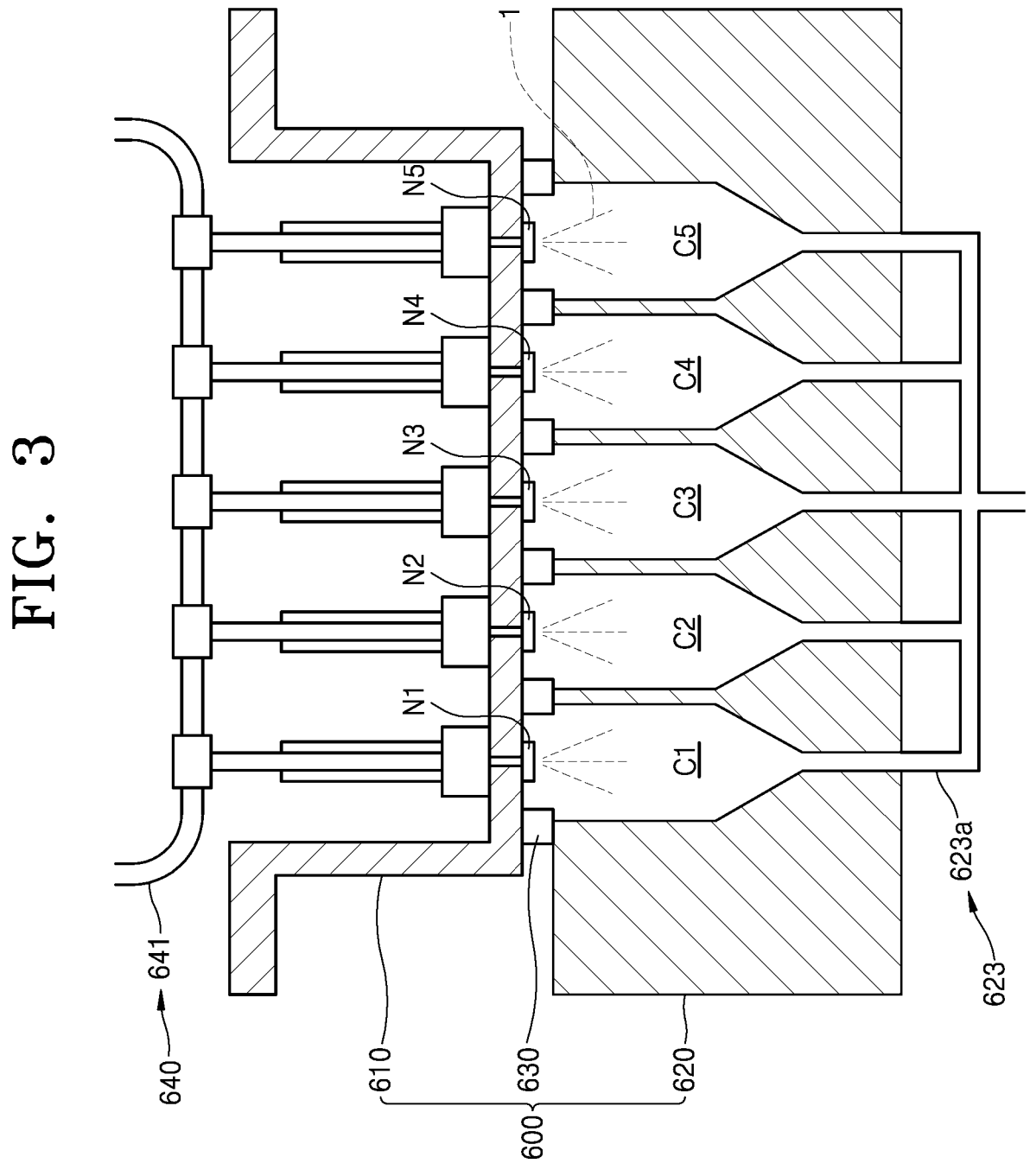
FIG. 3 is an enlarged cross-sectional view showing a chamber-coupled state of the head life evaluation apparatus of FIG. 2.
Figure 4:
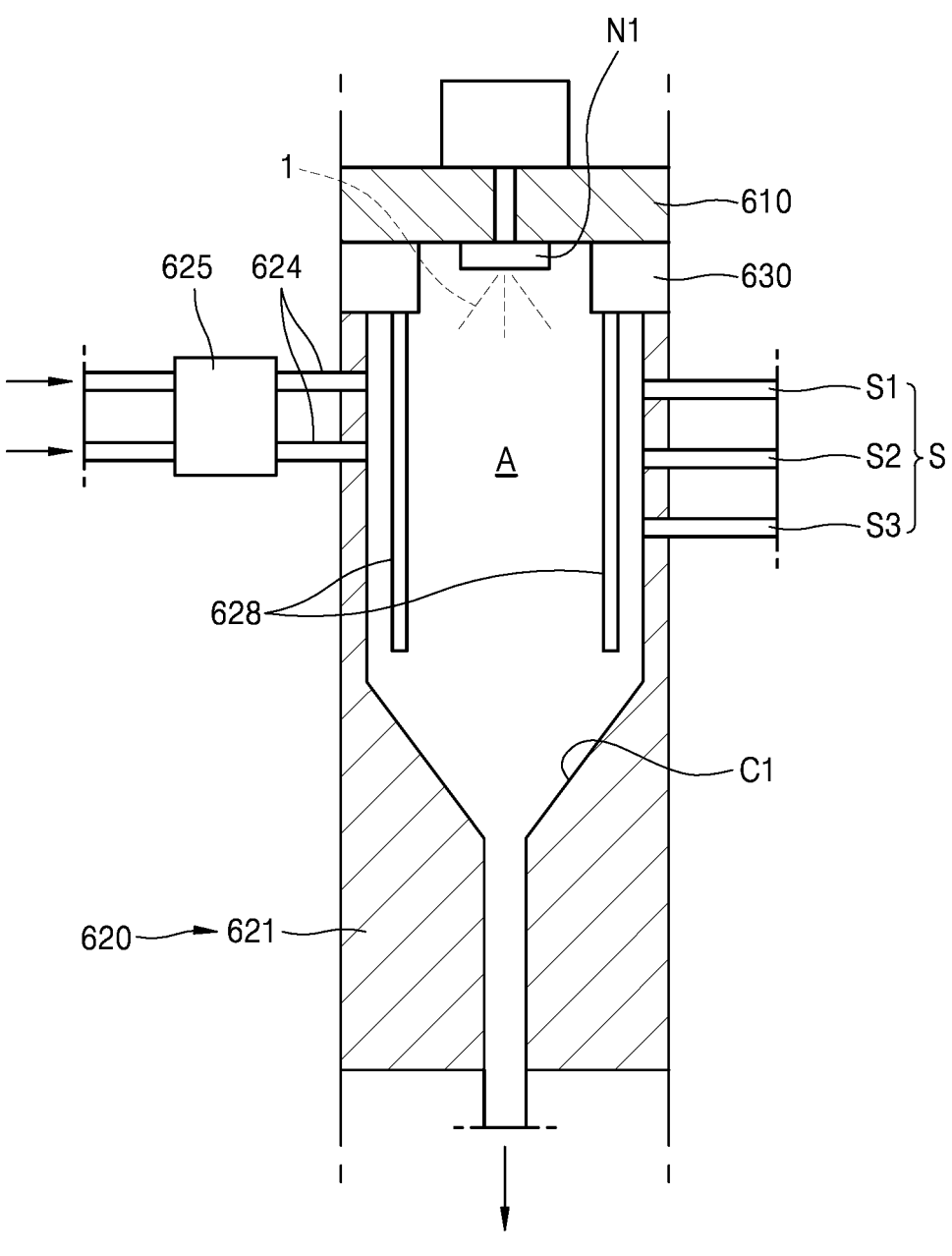
FIG. 4 is an enlarged cross-sectional view showing an example of a first chamber of the head life evaluation apparatus of FIG. 3.

FIG. 3 is an enlarged cross-sectional view showing a chamber-coupled state of the head life evaluation apparatus 600 of FIG. 2, and FIG. 4 is an enlarged cross-sectional view showing an example of the first chamber C1 of the head life evaluation apparatus 600 of FIG. 3.

As shown in FIGS. 3 and 4, the first chamber C1 may include a chamber body 621 providing an inner space A having an open top, a treatment liquid discharge line 623 mounted under the inner space A, a humidity control line 624 for supplying humidified or dehumidified air or moisture to the inner space A to maintain the inner space A at a first humidity, and a temperature control device 625 mounted on the humidity control line 624 or the chamber body 621 to maintain the inner space A at a first temperature.

In addition, the first chamber C1 may further include a sensor SS including a humidity sensor S1, a temperature sensor S2, and an oxygen sensor S3, and a controller 70 (see FIG. 7) for receiving a measurement signal from the sensor SS and applying at least one of a humidity control signal for maintaining the inner space A at a certain humidity, a temperature control signal for maintaining the inner space A at a certain temperature, and combinations thereof to at least the humidity control line 624 or the temperature control device 625.

Therefore, the controller 70 to be described below in relation to FIG. 7 may maintain the inner space A of the first chamber C1 at the first humidity or the first temperature by using the humidity control line 624 or the temperature control device 625.

Figure 5:
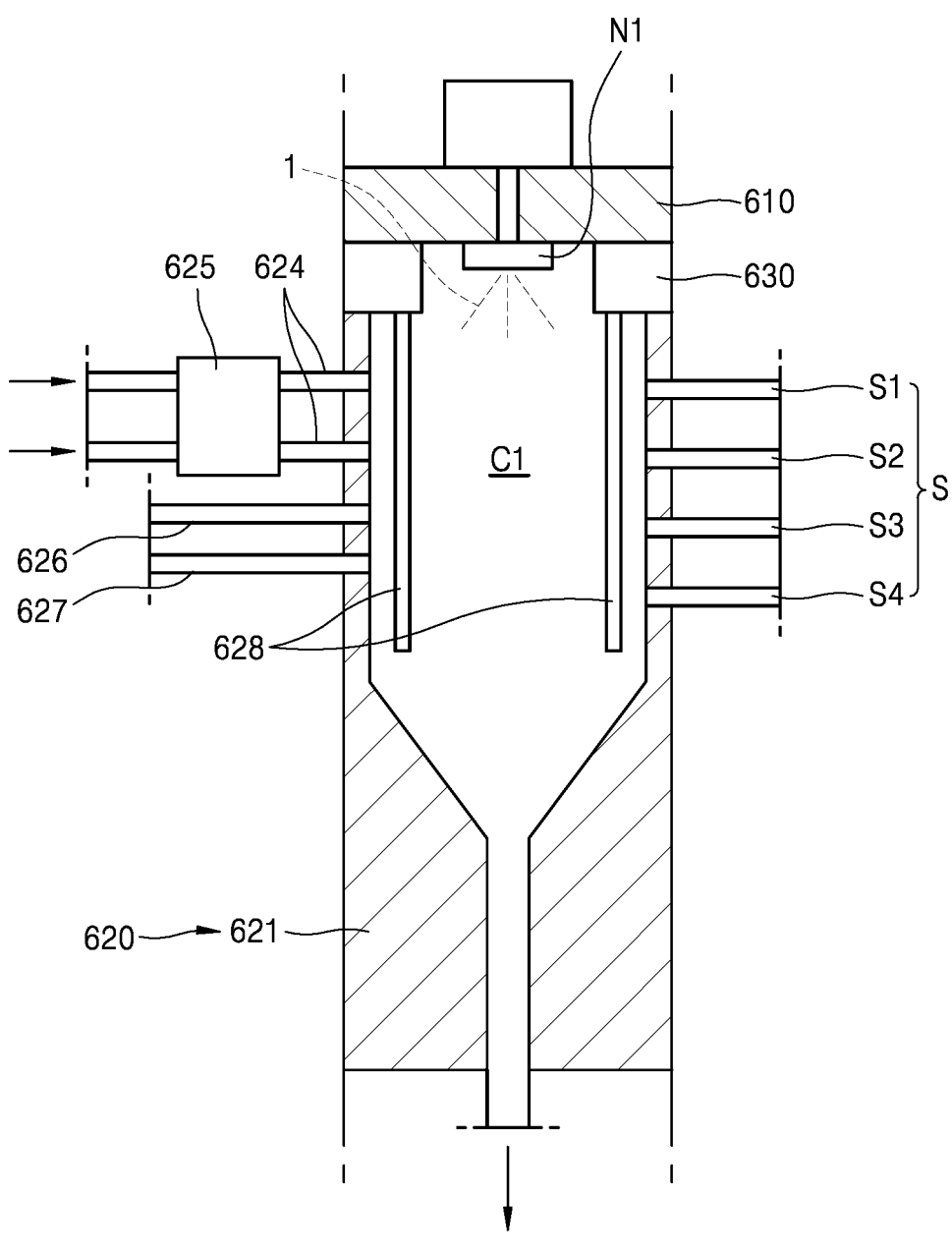
FIG. 5 is an enlarged cross-sectional view showing another example of the first chamber of the head life evaluation apparatus of FIG. 4.

FIG. 5 is an enlarged cross-sectional view showing another example of the first chamber C1 of the head life evaluation apparatus 600 of FIG. 4.

As shown in FIG. 5, the first chamber C1 may further include an oxygen supply device 626 mounted on the chamber body 621 to maintain the inner space A at a first oxygen level, and a pressure control line 627 mounted on the chamber body 621 to maintain the inner space A at a first pressure.

In addition, the first chamber C1 may further include a pressure sensor S4 for measuring a pressure of the inner space A, and the controller 70 to be described below in relation to FIG. 7 may maintain the inner space A of the first chamber C1 at the first oxygen level or the first pressure by applying an oxygen control signal for maintaining a certain oxygen level or a pressure control signal for maintaining a certain pressure, to the oxygen supply device 626 or the pressure control line 627.

Therefore, as shown in FIGS. 1 to 5, for example, the first chamber C1 may be maintained at the first humidity, the first temperature, the first oxygen level, and the first pressure, the second chamber C2 may be maintained at a second humidity, a second temperature, a second oxygen level, and a second pressure, the third chamber C3 may be maintained at a third humidity, a third temperature, a third oxygen level, and a third pressure, the fourth chamber C4 may be maintained at a fourth humidity, a fourth temperature, a fourth oxygen level, and a fourth pressure, and the fifth chamber C5 may be maintained at a fifth humidity, a fifth temperature, a fifth oxygen level, and a fifth pressure.

Specifically, for example, humidity environments of the chambers C1 to C5 may be created differently by controlling the first humidity of the first chamber C1 to 20%, the second humidity of the second chamber C2 to 40%, the third humidity of the third chamber C3 to 60%, the fourth humidity of the fourth chamber C4 to 80%, and the fifth humidity of the fifth chamber C5 to 100%, the treatment liquid 1 may be sprayed simultaneously by operating the first to fifth nozzles N1 to N5 for a certain period of time (e.g., several hours to several months), and conditions of the nozzles N1 to N5 may be evaluated by decoupling the head block 610 from the chamber block 620 and inspecting the nozzles N1 to N5. As such, the humidity of a chamber to which a nozzle in the best condition belongs may be found and evaluated as an optimal humidity. An optimal temperature, an optimal oxygen level, and an optimal pressure may also be evaluated in the same manner and thus a humidity environment, a temperature environment, an oxygen environment, and a pressure environment may be optimally designed for future system operation.

Meanwhile, as shown in FIGS. 1 to 5, the chamber body 621 may include a treatment liquid collector 621a provided in a funnel shape under the inner space A, and the treatment liquid collector 621a may be connected to the treatment liquid discharge line 623.

Specifically, for example, as shown in FIGS. 1 to 5, the treatment liquid discharge line 623 may include a treatment liquid discharge pipe 623a connected to the chamber body 621, a separation tank 623b connected to the treatment liquid discharge pipe 623a to separate the treatment liquid 1 from a gas G, a drain line 623c provided at a lower portion of the separation tank 623b to discharge the treatment liquid 1, a vacuum line 623d provided at an upper portion of the separation tank 623b to form a vacuum pressure in the separation tank 623b, a purge line 623e for purifying the inside of the separation tank 623b, and a discharge valve 623f mounted on the treatment liquid discharge pipe 623a.

Therefore, as shown in FIGS. 1 and 2, the treatment liquid 1 ejected into the inner space A through the first nozzle N1 may be collected into the treatment liquid discharge line 623 by the treatment liquid collector 621a, and temporarily stored in the separation tank 623b through the treatment liquid discharge pipe 623a. In the separation tank 623b, the gas G may be separated and discharged through the vacuum line 623d, and the treatment liquid 1 may be separated and discharged through the drain line 623c. Thereafter, the treatment liquid discharge pipe 623a may be blocked by the discharge valve 623f and then the inside of the separation tank 623b may be purified using the purge line 623e.

Meanwhile, as shown in FIGS. 4 and 5, the first chamber C1 may further include a separator 628 mounted in the chamber body 621 to protect the first nozzle N1 or the sensor SS from air or moisture.

Herein, the separator 628 may be a mesh member capable of filtering out foreign substances, or a stabilizer which is a kind of shower head having a plurality of through holes or pores to make air flows uniform.

Therefore, using the separator 628, the sensor SS or the nozzle N1 may be protected from the air or gas flowing into the first chamber C1, and reliability of head life evaluation may be improved by making air flows in the inner space A uniform.

As shown in FIGS. 1 to 5, the head life evaluation apparatus 600 according to some embodiments of the present invention may further include a guide 630 mounted between the head block 610 and the chamber block 620 to seal all of the first to fifth chambers C1 to C5 of the chamber block 620 when the head block 610 is coupled to the chamber block 620.

Specifically, for example, the guide 630 may be an O-ring or a sealing member. In addition, various types of guide members such as a gasket are all applicable.

Therefore, using the guide 630, the chambers C1 to C5 may be sealed from an external environment to maintain the environments formed in the chambers C1 to C5, and internal components may be protected. The guide 630 may be mounted on the head block 610 or the chamber block 620, and a wide variety of guide members are all applicable without being limited to the illustration.

As shown in FIGS. 1 to 5, the head life evaluation apparatus 600 according to some embodiments of the present invention may further include a treatment liquid supply device 640 for supplying the treatment liquid 1 simultaneously and uniformly to the first to n-th nozzles N1 to Nn.

For example, the treatment liquid supply device 640 may include a treatment liquid supply line 641 for delivering the treatment liquid 1 such as an organic material, ink, or a liquid chemical, valves V for closing the treatment liquid supply line 641, a pump P mounted on the treatment liquid supply line 641, and a treatment liquid reservoir 643 for storing the treatment liquid 1.

Therefore, the treatment liquid 1 may be supplied simultaneously and uniformly to the first to fifth nozzles N1 to N5 by using the treatment liquid supply device 640.

Figure 6:
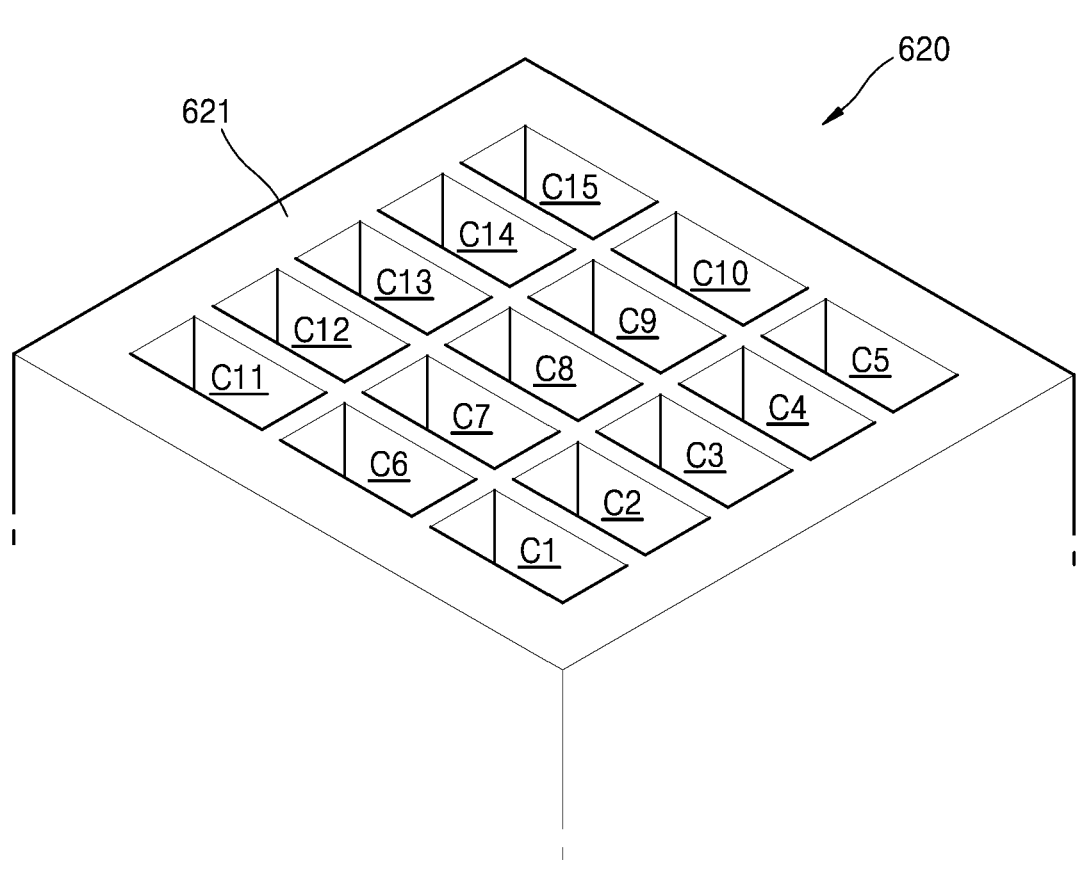
FIG. 6 is a perspective view of a chamber block of the head life evaluation apparatus of FIG. 1.

FIG. 6 is a perspective view of the chamber block 620 of the head life evaluation apparatus 600 of FIG. 1.

As shown in FIG. 6, according to the present invention, in order to evaluate lifespans of a large number of nozzles at a time, the chamber block 620 is not limited to the first to fifth chambers C1 to C5 and may include, for example, first to fifteenth chambers C1 to C15 arranged in a plurality of rows.

A head life evaluation process of the present invention will now be described with reference to FIGS. 1 and 2. Initially, as shown in FIG. 1, the head block 610 including the first to n-th nozzles N1 to Nn may be prepared. Herein, the prepared head block 610 or the prepared nozzles N1 to Nn may vary greatly in number, shape, or the like.

Thereafter, as shown in FIG. 2, the head block 610 may be coupled to the chamber block 620 such that the first to n-th nozzles N1 to Nn respectively correspond to the first to n-th chambers C1 to Cn. In this case, the chambers C1 to Cn may be separately sealed using the guide 630.

Then, different first to n-th environments may be created in the first to n-th chambers C1 to Cn. Herein, the environments may include a wide variety of environments such as humidity environments, temperature environments, oxygen environments, and pressure environments.

After that, the treatment liquid 1 may be supplied simultaneously to the first to n-th nozzles N1 to Nn in different environments for a certain period of time (e.g., several hours, several days, or several months).

In this case, the treatment liquid 1 supplied to the first to n-th chambers C1 to Cn may be collected through the treatment liquid discharge line 623.

Then, the head block 610 may be decoupled from the chamber block 620, the first to n-th nozzles N1 to Nn may be inspected using various methods such as visual inspection, microscopic inspection, printing inspection, or cutting inspection to find an optimal environment condition capable of maximizing the nozzle lifespan, and the optimal environment condition may be used later to create an actual environment for a treatment liquid coating process.

Accordingly, lifespans of the nozzles N1 to N5 may be evaluated using a plurality of chambers C1 to C5 controlled to different environments, an environment condition, e.g., humidity, temperature, oxygen level, and pressure, optimized for a head may be obtained based on the evaluation result, an evaluation time and an evaluation cost may be significantly reduced by evaluating lifespans of a large number of heads or nozzles at a time, and durability of the head, the nozzles, and various internal components may be increased using a separator for protecting the internal components.

Figure 7:
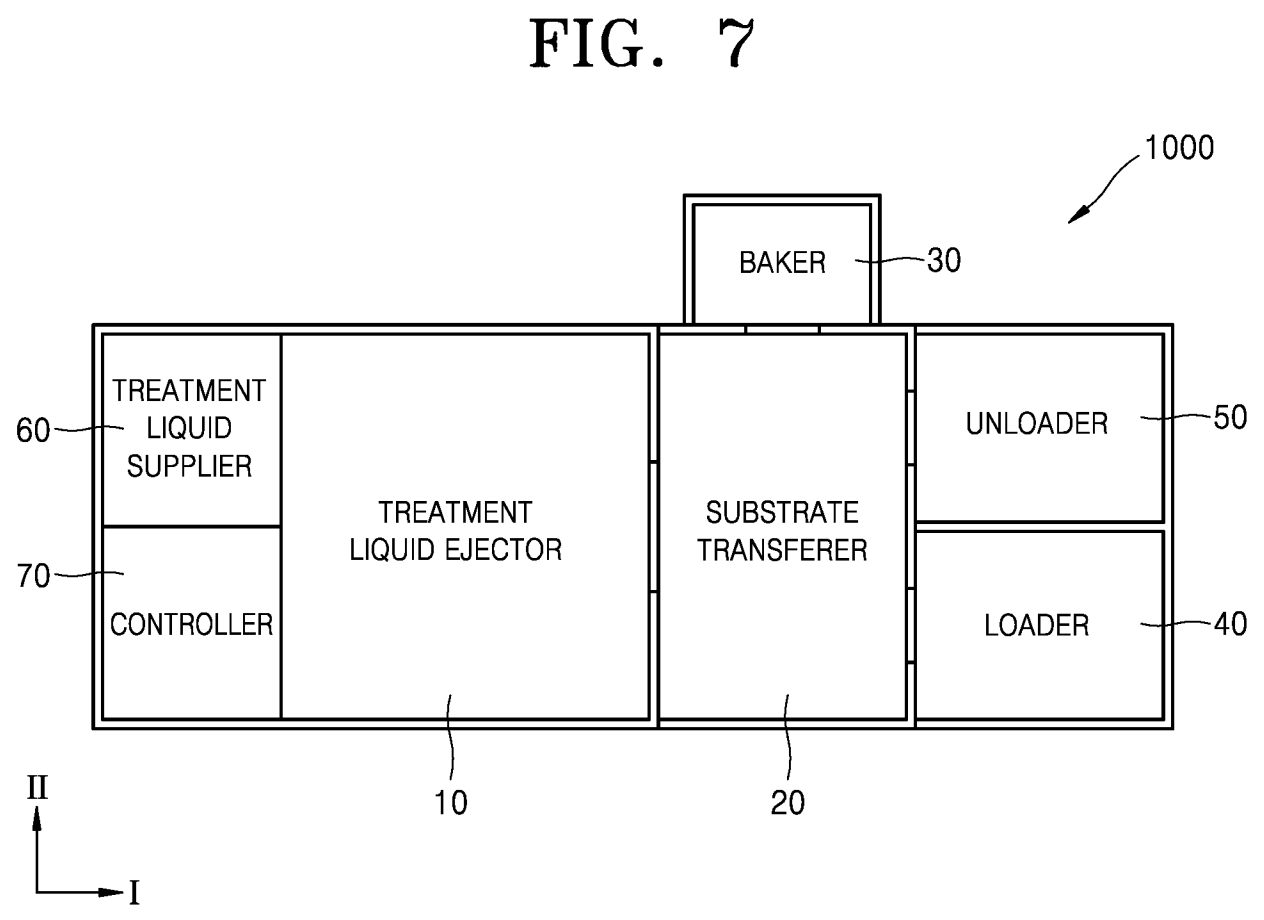

FIG. 7 is a plan view of a treatment liquid coating system 1000 including the head life evaluation apparatus 600 of FIG. 1.

The head life evaluation apparatus 600 according to some embodiments of the present invention may be mounted independently at a separate place, or temporarily mounted only for a limited period of time in the treatment liquid coating system 1000 for coating the treatment liquid 1 on a substrate S, to find an optimal environment condition.

As shown in FIG. 7, the treatment liquid coating system 1000 may coat a treatment liquid on a target object in an inkjet manner. For example, the target object may be a glass substrate, a silicon substrate, a display substrate, or a color filter substrate of a liquid crystal display panel, and the treatment liquid may be red (R), green (G), or blue (B) ink obtained by mixing pigment particles in a solvent. The ink may be coated on inner regions of a black matrix provided as a grid pattern on the color filter substrate.

The treatment liquid coating system 1000 includes a treatment liquid ejector 10, a substrate transferer 20, a baker 30, a loader 40, an unloader 50, a treatment liquid supplier 60, and a controller 70. The treatment liquid ejector 10 and the substrate transferer 20 may be disposed in a row in a first direction I and positioned adjacent to each other. The treatment liquid supplier 60 and the controller 70 may be positioned to face the substrate transferer 20 across the treatment liquid ejector 10, and disposed in a row in a second direction II.

The loader 40 and the unloader 50 may be positioned to face the treatment liquid ejector 10 across the substrate transferer 20, and disposed in a row in the second direction II. The baker 30 may be disposed adjacent to a side of the substrate transferer 20.

Herein, the first direction I is a direction in which the treatment liquid ejector 10 and the substrate transferer 20 are arranged, the second direction II is a direction perpendicular to the first direction I on a horizontal plane, and a third direction III is a direction perpendicular to the first and second directions I and II.

The substrate to be coated with the treatment liquid (i.e., the ink) may be loaded into the loader 40. The substrate transferer 20 may transfer the substrate loaded into the loader 40, to the treatment liquid ejector 10. The treatment liquid ejector 10 may receive the treatment liquid from the treatment liquid supplier 60, and eject the treatment liquid onto the substrate in an inkjet manner. The substrate transferer 20 may transfer the substrate from the treatment liquid ejector 10 to the baker 30. The baker 30 may heat the substrate to evaporate a liquid material (i.e., the solvent) except for a solid component of the treatment liquid (i.e., the ink) ejected onto the substrate. The substrate transferer 20 may transfer the substrate from the baker 30 to the unloader 50. The substrate coated with the treatment liquid may be unloaded from the unloader 50. The controller 70 may control overall operations of the treatment liquid ejector 10, the substrate transferer 20, the baker 30, the loader 40, the unloader 50, and the treatment liquid supplier 60.

Figure 8:
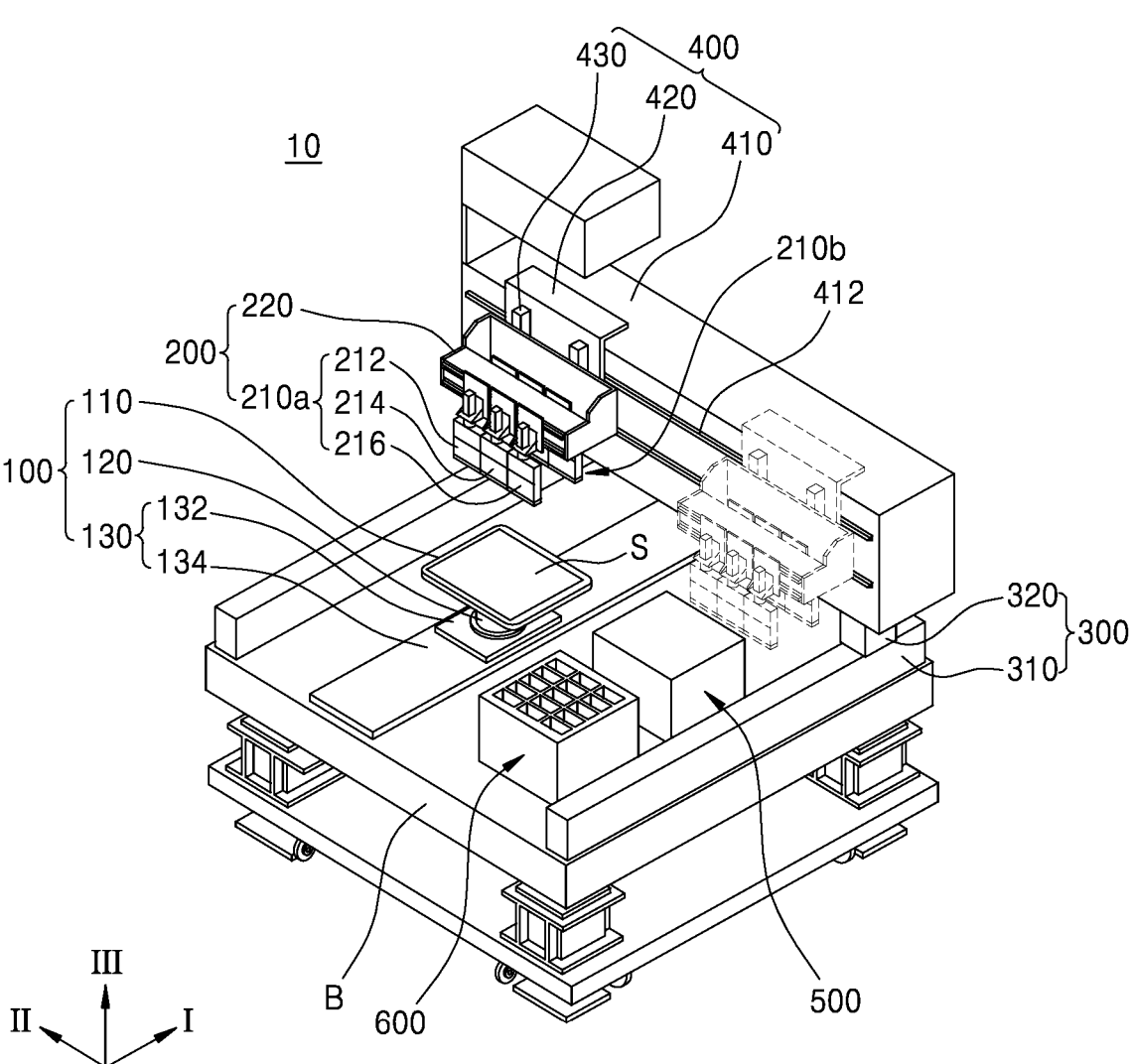
FIG. 8 is a perspective view of a treatment liquid ejector of the treatment liquid coating system including the head life evaluation apparatus of FIG. 7.
Figure 9:
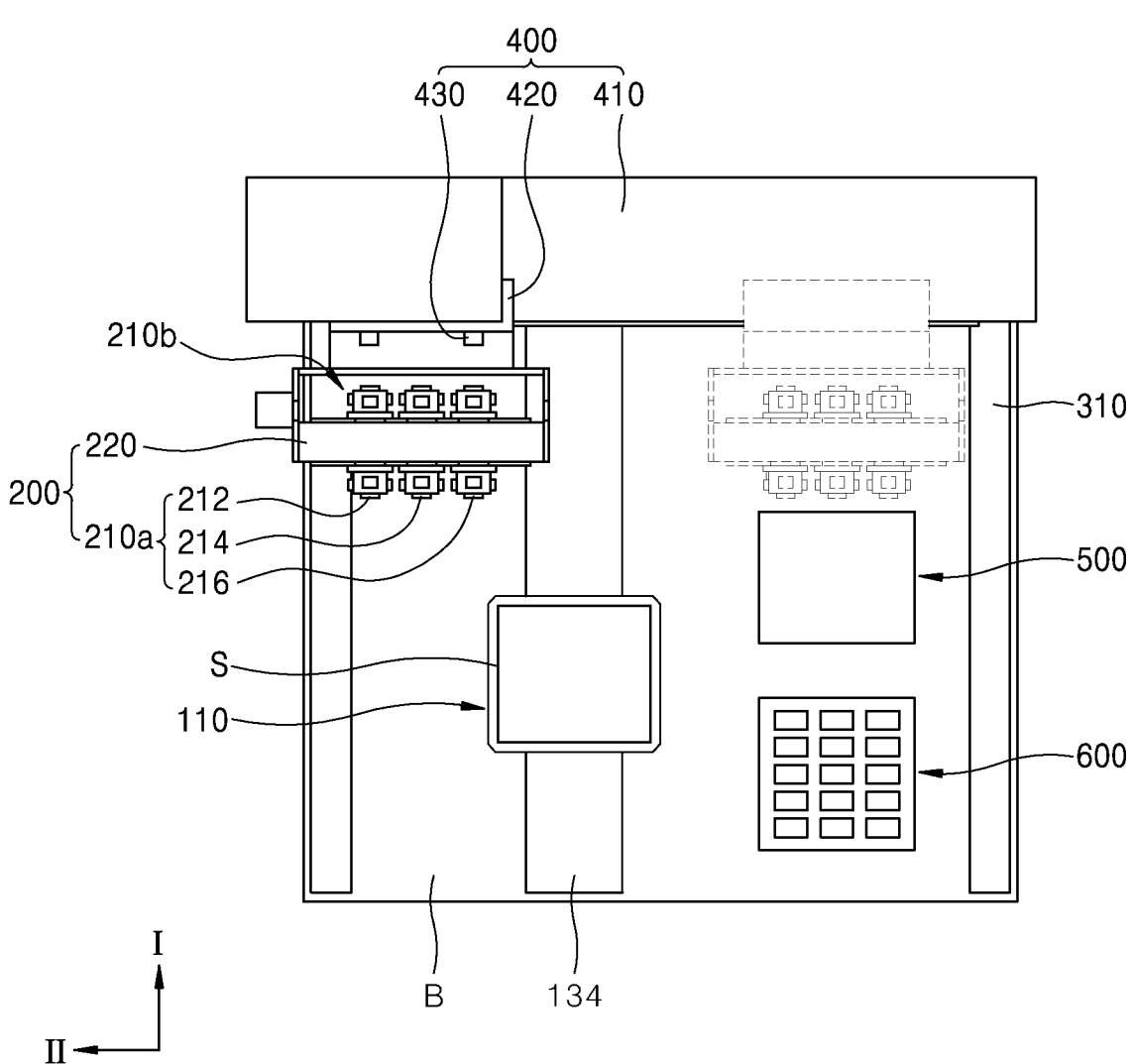
FIG. 9 is a plan view of the treatment liquid ejector including the head life evaluation apparatus of FIG. 8.

FIG. 8 is a perspective view of the treatment liquid ejector 10 of the treatment liquid coating system 1000 including the head life evaluation apparatus 600 of FIG. 7, and FIG. 9 is a plan view of the treatment liquid ejector 10 including the head life evaluation apparatus 600 of FIG. 8.

As shown in FIGS. 8 and 9, the treatment liquid ejector 10 may include a substrate support unit 100, a head unit 200, moving units 300 and 400, a head cleaning unit 500, and the above-described head life evaluation apparatus 600.

The substrate support unit 100 may have a support plate 110 on which a substrate S is placed. The support plate 110 may be a rectangular plate. A rotating shaft of a rotary driving motor 120 may be connected to a bottom surface of the support plate 110. The rotary driving motor 120 may rotate the support plate 110 in such a manner that the substrate S placed on the support plate 110 is aligned at a preset position.

The support plate 110 and the rotary driving motor 120 may be linearly moved in the first direction I by a linear driving member 130. The linear driving member 130 may include a slider 132 and a guide member 134. The rotary driving motor 120 may be mounted on a top surface of the slider 132. The guide member 134 extends in the first direction I in the middle of a top surface of a base B. The slider 132 may have an embedded linear motor (not shown), and linearly move in the first direction I along the guide member 134.

The head unit 200 may eject a treatment liquid onto the substrate S. The head unit 200 may include inkjet heads 210a and 210b and a bracket 220. Among the inkjet heads 210a and 210b, one inkjet head 210a may be mounted on one side surface of the bracket 220 facing the first direction I, and another inkjet head 210b may be mounted on another side surface of the bracket 220 facing the first direction I.

Each of the inkjet heads 210a and 210b may have a red (R) head 212, a green (G) head 214, and a blue (B) head 216.

The R, G, and B heads 212, 214, and 216 may be arranged in a row in the second direction II to eject the treatment liquid onto the substrate S placed on the support plate 110 by using an inkjet scheme for ejecting droplets.

The moving units 300 and 400 may move the head unit 200 above a path along which the support plate 110 is moved. The first moving unit 300 may linearly move the head unit 200 in the first direction I, and the second moving unit 400 may linearly move the head unit 200 in the second and third directions II and III.

The second moving unit 400 may include a horizontal support bar 410, a slider 420, and a lifting device 430. The horizontal support bar 410 may be positioned above the base B in such a manner that a longitudinal direction thereof faces the second direction II. Guide rails 412 may be provided on the horizontal support bar 410 along the longitudinal direction. The slider 420 may have an embedded linear motor (not shown), and linearly move in the second direction II along the guide rails 412. The bracket 220 of the head unit 200 may be connected to the slider 420, and the inkjet heads 210a and 210b mounted on the bracket 220 may be linearly moved in the second direction II by the linear motion of the slider 420. Meanwhile, the lifting device 430 for linearly moving the bracket 220 of the head unit 200 in the third direction III may be mounted on the slider 420.

The first moving unit 300 may include guide rails 310 and sliders 320. The guide rails 310 may have longitudinal directions facing the first direction I, and be separately disposed at two opposite edges on the top surface of the base B across the guide member 134 of the substrate support unit 100. The sliders 320 may have embedded linear motors (not shown), and linearly move in the first direction I along the guide rails 310. Both ends of the horizontal support bar 410 of the second moving unit 400 may be separately connected to the sliders 320. The second moving unit 400 including the horizontal support bar 410 may be moved in the first direction I by the linear motion of the sliders 320, and the head unit 200 connected to the second moving unit 400 may be linearly moved in the second direction II by the motion of the second moving unit 400.

The head unit 200 may be linearly moved in the first, second, and third directions I, II, and III by the first and second moving units 300 and 400, and the support plate 110 on which the substrate S is placed may be linearly moved in the first direction I by the slider 132 and the guide member 134. When the treatment liquid is ejected onto the substrate S, the head unit 200 may be fixed at a preset position, and the support plate 110 on which the substrate S is placed may be moved in the first direction I. Unlike this, the support plate 110 on which the substrate S is placed may be fixed at a preset position, and the head unit 200 may be moved in the first direction I.

The head cleaning unit 500 may periodically clean treatment liquid ejection surfaces of the inkjet heads 210a and 210b, i.e., surfaces on which nozzles for ejecting the treatment liquid are provided. Normally, after the treatment liquid ejection process is performed on one substrate, the treatment liquid ejection surfaces of the inkjet heads 210a and 210b may be cleaned.

The head cleaning unit 500 may be provided at a side of the substrate support unit 100 on the top surface of the base B. The inkjet heads 210a and 210b may be moved to the top of the head cleaning unit 500 by the first and second moving units 300 and 400, and moved in the first direction I above the head cleaning unit 500 during the cleaning process.

The head cleaning unit 500 may perform a purging, blading, or blotting processes. The purging, blading, and blotting processes may be sequentially performed. The purging process is a process of spraying some of the treatment liquid contained in the inkjet heads 210a and 210b at high pressure. The blading process is a process of removing the treatment liquid remaining on the treatment liquid ejection surfaces of the inkjet heads 210a and 210b in a non-contact manner after the purging process. The blotting process is a process of removing the treatment liquid remaining on the treatment liquid ejection surfaces of the inkjet heads 210a and 210b in a contact manner after the blading process. However, the head cleaning unit 500 is not limited thereto, and a wide variety of cleaning units are all applicable.

The head life evaluation apparatus 600 may mainly include the head block 610 and the chamber block 620 as shown in FIGS. 1 to 6, and have the same configuration and function as the above-described head life evaluation apparatus 600 according to some embodiments of the present invention. Thus, a detailed description thereof is not provided herein.

Therefore, the head life evaluation apparatus 600 may be temporarily mounted only for a limited period of time in a mass production system for coating the treatment liquid 1 on the substrate S, i.e., the treatment liquid coating system 1000, to find an optimal environment condition for the system.

FIG. 10 is a flowchart of a head life evaluation method according to some embodiments of the present invention.

As shown in FIGS. 1 to 10, the head life evaluation method according to some embodiments of the present invention may include (a) preparing the head block 610 including the first to n-th nozzles N1 to Nn, (b) coupling the head block 610 to the chamber block 620 such that the first to n-th nozzles N1 to Nn respectively correspond to the first to n-th chambers C1 to Cn, (c) creating different first to n-th environments in the first to n-th chambers C1 to Cn, (d) supplying the treatment liquid 1 simultaneously to the first to n-th nozzles N1 to Nn in different environments for a certain period of time, and (e) inspecting the first to n-th nozzles N1 to Nn by selecting at least one of visual inspection, microscopic inspection, printing inspection, cutting inspection, and combinations thereof.

Herein, for example, in step (c), the first to n-th chambers C1 to Cn may be differently controlled by selecting at least one of a humidity, a temperature, an oxygen level, a pressure, and combinations thereof.

For example, in step (d), the treatment liquid 1 supplied to the first to n-th chambers C1 to Cn may be collected through the treatment liquid discharge line 623.

According to the afore-described embodiments of the present invention, lifespans of nozzles may be evaluated using a plurality of chambers controlled to different environments, an environment condition optimized for a head may be obtained based on the evaluation result, an evaluation time and an evaluation cost may be significantly reduced by evaluating lifespans of a large number of heads or nozzles at a time, and durability of the head, the nozzles, and various internal components may be increased using a separator for protecting the internal components. However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A head life evaluation apparatus comprising:

a head block comprising at least one first nozzle for ejecting a treatment liquid in an inkjet manner; and a chamber block detachably coupled to the head block and comprising at least one first chamber corresponding to the first nozzle to evaluate a lifespan of the first nozzle in a first environment wherein first to n-th nozzles (where n is a natural number greater than 1) are disposed in one or more rows on a surface of the head block facing the chamber block, and wherein first to n-th chambers provided in a concave shape to respectively correspond to the first to n-th nozzles are disposed in one or more rows on a surface of the chamber block facing the head block, wherein the head block is an upper movable structure raised or lowered by a lifting device, and wherein the chamber block is a lower fixed structure fixed to be couplable to the head block.

2. The head life evaluation apparatus of claim 1, further comprising a guide mounted between the head block and the chamber block to seal the at least one first chamber of the chamber block when the head block is coupled to the chamber block.

3. The head life evaluation apparatus of claim 2, wherein the guide is an O-ring or a sealing member.

4. A head life evaluation method comprising:

(a) preparing a head block comprising first to n-th nozzles;

(b) coupling the head block to a chamber block such that the first to n-th nozzles respectively correspond to first to n-th chambers;

(c) creating different first to n-th environments in the first to n-th chambers; and (d) supplying a treatment liquid simultaneously to the first to n-th nozzles in different environments for a certain period of time, wherein, in step (c), the first to n-th chambers are differently controlled by selecting at least one of a humidity, a temperature an oxygen level a pressure and combinations thereof.

5. The head life evaluation method of claim 4, wherein, in step (d), the treatment liquid supplied to the first to n-th chambers is collected through a treatment liquid discharge line.

6. The head life evaluation method of claim 4, further comprising (e) inspecting the first to n-th nozzles by selecting at least one of visual inspection, microscopic inspection, printing inspection, cutting inspection, and combinations thereof, after step (d).

7. A head life evaluation apparatus comprising:
a head block comprising first to n-th nozzles (where n is a natural number greater than 1) for ejecting a treatment liquid in an inkjet manner; and
a chamber block detachably coupled to the head block and comprising first to n-th chambers respectively corresponding to the first to n-th nozzles to evaluate lifespans of the first to n-th nozzles in first to n-th environments,
wherein the first or n-th chamber comprises:
a chamber body providing an inner space having an open top;
a treatment liquid discharge line mounted under the inner space;
a humidity control line for supplying humidified or dehumidified air or moisture to the inner space to maintain the inner space at a first humidity or at an n-th humidity different from the first humidity;
a temperature control device mounted on the humidity control line or the chamber body to maintain the inner space at a first temperature or at an n-th temperature different from the first temperature;
an oxygen supply device mounted on the chamber body to maintain the inner space at a first oxygen level or at an n-th oxygen level different from the first oxygen level;
a sensor comprising at least one of a humidity sensor, a temperature sensor, an oxygen sensor, a pressure sensor, and combinations thereof; and
a controller for receiving a measurement signal from the sensor and applying at least one of a humidity control signal for maintaining the inner space at a certain humidity, a temperature control signal for maintaining the inner space at a certain temperature, an oxygen control signal for maintaining the inner space at a certain oxygen level, a pressure control signal for maintaining the inner space at a certain pressure, and combinations thereof selectively to at least one of the humidity control line, the temperature control device, the oxygen supply device, a pressure control line, and combinations thereof.

8. A head life evaluation apparatus comprising:
a head block comprising at least one first nozzle for ejecting a treatment liquid in an inkjet manner; and
a chamber block detachably coupled to the head block and comprising at least one first chamber corresponding to the first nozzle to evaluate a lifespan of the first nozzle in a first environment,
wherein first to n-th nozzles (where n is a natural number greater than 1) are disposed in one or more rows on a surface of the head block facing the chamber block, and
wherein first to n-th chambers provided in a concave shape to respectively correspond to the first to n-th nozzles are disposed in one or more rows on a surface of the chamber block facing the head block, wherein the first or n-th chamber comprises:
a chamber body providing an inner space having an open top;
a treatment liquid discharge line mounted under the inner space; and
a humidity control line for supplying humidified or dehumidified air or moisture to the inner space to maintain the inner space at a first humidity or at an n-th humidity different from the first humidity.

9. The head life evaluation apparatus of claim 1, wherein the first or n-th chamber comprises:
a chamber body providing an inner space having an open top;
a treatment liquid discharge line mounted under the inner space; and
a humidity control line for supplying humidified or dehumidified air or moisture to the inner space to maintain the inner space at a first humidity or at an n-th humidity different from the first humidity.

10. The head life evaluation apparatus of claim 9, wherein the first or n-th chamber further comprises a temperature control device mounted on the humidity control line or the chamber body to maintain the inner space at a first temperature or at an n-th temperature different from the first temperature.

11. The head life evaluation apparatus of claim 9, wherein the first or n-th chamber further comprises an oxygen supply device mounted on the chamber body to maintain the inner space at a first oxygen level or at an n-th oxygen level different from the first oxygen level.

12. The head life evaluation apparatus of claim 9, wherein the first or n-th chamber further comprises a pressure control line mounted on the chamber body to maintain the inner space at a first pressure or at an n-th pressure different from the first pressure.

13. The head life evaluation apparatus of claim 9, further comprising:
a sensor comprising at least one of a humidity sensor, a temperature sensor, an oxygen sensor, a pressure sensor, and combinations thereof; and
a controller for receiving a measurement signal from the sensor and applying at least one of a humidity control signal for maintaining the inner space at a certain humidity, a temperature control signal for maintaining the inner space at a certain temperature, an oxygen control signal for maintaining the inner space at a certain oxygen level, a pressure control signal for maintaining the inner space at a certain pressure, and combinations thereof selectively to at least one of the humidity control line, a temperature control device, an oxygen supply device, a pressure control line, and combinations thereof.

14. The head life evaluation apparatus of claim 9, wherein the chamber body comprises a treatment liquid collector provided in a funnel shape under the inner space, and
wherein the treatment liquid collector is connected to the treatment liquid discharge line.

15. The head life evaluation apparatus of claim 9, wherein the treatment liquid discharge line comprises:
a treatment liquid discharge pipe connected to the chamber body;
a separation tank connected to the treatment liquid discharge pipe to separate the treatment liquid from a gas;
a drain line provided at a lower portion of the separation tank to discharge the treatment liquid;

a vacuum line provided at an upper portion of the separation tank to form a vacuum pressure in the separation tank; and a purge line for purifying an inside of the separation tank.

16. The head life evaluation apparatus of claim 9, wherein the first or n-th chamber further comprises a separator mounted in the chamber body to protect the first nozzle or a sensor from air or moisture.

17. The head life evaluation apparatus of claim 16, wherein the separator is a mesh member capable of filtering out foreign substances, or a stabilizer capable of making air flows uniform.

18. The head life evaluation apparatus of claim 1, further comprising a treatment liquid supply device for supplying the treatment liquid simultaneously to the first to n-th nozzles.

19. A head life evaluation apparatus comprising:

a head block comprising at least one first nozzle for ejecting a treatment liquid in an inkjet manner; and a chamber block detachably coupled to the head block and comprising at least one first chamber corresponding to the first nozzle to evaluate a lifespan of the first nozzle in a first environment, further comprising a guide mounted between the head block and the chamber block to seal the at least one first chamber of the chamber block when the head block is coupled to the chamber block.

20. A head life evaluation method comprising:

(a) preparing a head block comprising first to n-th nozzles;

(b) coupling the head block to a chamber block such that the first to n-th nozzles respectively correspond to first to n-th chambers;

(c) creating different first to n-th environments in the first to n-th chambers; and (d) supplying a treatment liquid simultaneously to the first to n-th nozzles in different environments for a certain period of time, wherein, in step (d), the treatment liquid supplied to the first to n-th chambers is collected through a treatment liquid discharge line.

* * * * *